(12) United States Patent
Lee (10) Patent No.: US 6,816,804 B1
(45) Date of Patent: Nov. 9, 2004

(54) SYSTEM AND METHOD FOR ESTIMATING VELOCITY USING RELIABILITY INDEXED SENSOR FUSION

(75) Inventor: Hyeongcheol Lee, Ann Arbor, MI (US)

(73) Assignee: Visteon Global Technologies, Inc., Dearborn, MI (US)

(*) Notice: Subject to any disclaimer, the term of this patent is extended or adjusted under 35 U.S.C. 154(b) by 0 days.

(21) Appl. No.: 10/454,658

(22) Filed: Jun. 4, 2003

(51) Int. Cl.[7] .............................. G01P 3/00; G01F 15/00
(52) U.S. Cl. ................ 702/148; 702/141; 702/142; 702/145; 702/150; 701/45; 701/72
(58) Field of Search .............................. 702/141, 142, 702/145, 147, 148, 150, 151, 191; 701/1, 36, 45, 72, 213; 303/140, 146–147

(56) References Cited

U.S. PATENT DOCUMENTS

| | | | |
|---|---|---|---|
| 5,371,677 A | * 12/1994 | Ehret et al. | .................... 701/72 |
| 5,408,411 A | * 4/1995 | Nakamura et al. | ............ 701/48 |
| 5,416,712 A | 5/1995 | Geier et al. | |
| 5,626,140 A | 5/1997 | Feldman et al. | |
| 5,676,433 A | 10/1997 | Inagaki et al. | |
| 5,711,024 A | 1/1998 | Wanke | |
| 5,878,357 A | * 3/1999 | Sivashankar et al. | .......... 701/1 |
| 5,883,595 A | 3/1999 | Colley | |
| 5,999,890 A | 12/1999 | Kihara | |
| 6,081,230 A | 6/2000 | Hoshino et al. | |
| 6,092,033 A | 7/2000 | Uhlmann | |
| 6,161,905 A | 12/2000 | Hac et al. | |
| 6,240,367 B1 | 5/2001 | Lin | |
| 6,269,306 B1 | 7/2001 | Ibrahim et al. | |
| 6,311,123 B1 | 10/2001 | Nakamura et al. | |
| 6,418,369 B2 | 7/2002 | Matsumoto et al. | |
| 6,609,080 B1 | * 8/2003 | Syrjarinne | .................. 702/150 |

OTHER PUBLICATIONS

Farrelly, J. et al., "Estimation Of Vehicle Lateral Velocity Using State Observers," Proceedings Of The 1996 IEEE International Conference On Control Applications, Dearborn, MI, pp. 1–10, Jan. 1996.

Hac, A. et al., "Estimation Of Vehicle Side Slip Angle And Yaw Rate," Society Of Automotive Engineers, Inc. 2000–01–0606, pp. 1–7 (2000).

(List continued on next page.)

Primary Examiner—Bryan Bui
(74) Attorney, Agent, or Firm—Dickinson Wright PLLC (57) ABSTRACT

A method and system for vehicle velocity estimation. The method and system effectively combine vehicle kinetic and kinematic models to determine the noise covariance or reliability of vehicle sensor signals, and vehicle approximated velocity. The vehicle approximated velocity, sensor signals, and noise covariances are used in conjunction with a Kalman filter to determine the estimated velocity of the vehicle. The noise covariance is calculated from the relationship between various sensor signals and calculated values by determining if the sensor signal and calculated values correspond to a vehicle operating state.

20 Claims, 4 Drawing Sheets

OTHER PUBLICATIONS

Tseng, H.E., "Dynamic Estimation Of Road Bank Angle," Proceedings of AVEC 2000, 5th Int'l Symposium on Advanced Vehicle Control, Ann Arbor, MI, 8 pages, Aug. 22–24, 2000.

Gustafsson, F. et al., "Sensor Fusion For Accurate Computation Of Yaw Rate And Absolute Velocity," Society of Automotive Engineers, Inc., 2001–01–1064, pp. 1–8 (2001).

Jazwinski, Andrew H., "Stochastic Processes And Filtering Theory," Academic Press, New York, 1970 (pp. 234–243).

Bar–Shalom, Y. et al., "Chapter 2—State Estimation For Linear Systems," Tracking And Data Association, Academic Press, Inc., Mathematics in Science and Engineering, 1988 (pp. 9–79).

Senger, K.H., et al., "Investigations On State Observers For The Lateral Dynamics Of Four–Wheel Steered Vehicles," Proceedings of the 11th International Association For Vehicle Systems Dynamics (IAVSD) Symposium, Kingston, Canada, 1989 (pp. 515–527).

Hall, D.L., "Chapter 1—Introduction To Multisensor Data Fusion," Mathematical Techniques In Multisensor Data Fusion, Artech House, Inc., Norwood, MA, 1992 (pp. 1–34).

Lee, H., "Chapter 4—Reliability Indexed Sensor Fusion In An Adaptive Kalman Filter Framework," Robust Adaptive Control Using A Universal Approximator With Application To Vehicle Motion Control For IVHS, Ph.D. Dissertation, UC Berkley, 1997 (pp. 87–108).

Wong, J.Y., Theory Of Ground Vehicles, 2nd Edition, John Wiley & Sons, Inc., New York, 2001 (pp. 303–309).

* cited by examiner

SYSTEM AND METHOD FOR ESTIMATING VELOCITY USING RELIABILITY INDEXED SENSOR FUSION

BACKGROUND OF THE INVENTION

The present invention relates generally to a method of sensor fusion that uses a reliability index to economically and accurately estimate a vehicle's absolute velocity.

Absolute vehicle velocity includes both the lateral and longitudinal velocities and is used in many modern vehicle control systems. As manufacturers seek to increase the safety of vehicles, many vehicle control systems need accurate longitudinal and lateral velocity information. These systems include anti-lock brake systems, traction control systems, vehicle stability control systems, by wire control, and interactive or coordinated vehicle motion systems. As vehicle control systems become more complex and exert increasing control over a vehicle's motion, reliable velocity information is needed. Longitudinal velocity is generally determined by measuring the wheel angular speed and calculating the velocity of the vehicle. Wheel speed sensors are common in vehicles with anti-lock brakes or traction control systems.

One problem with using a longitudinal velocity calculated from angular wheel speed is that the calculated longitudinal velocity is not always equal to the actual or true vehicle velocity. For example, in less than optimal conditions, such as when the vehicle is traveling on wet, gravel, snow covered, or icy roads, the potential for the wheels to slip may be increased and therefore, the longitudinal velocity calculated from the wheel speed may differ from the actual longitudinal velocity. To avoid some of these problems, some systems determine the longitudinal velocity of a vehicle from the angular speeds of undriven wheels, but these systems are also problematic when the vehicle is braking, especially on less than ideal surfaces. Because each vehicle is driven on all-wheel or four-wheel drive vehicles, it is difficult to get an accurate and reliable estimation of the longitudinal velocity, especially during acceleration. To date, the industry has not developed an economically feasible method or system that measures or determines vehicle longitudinal velocity with desired speed, accuracy, and reliability.

Lateral velocity is more difficult to determine than longitudinal velocity because no baseline measurements exist in the lateral direction. Two approaches are generally used to determine lateral vehicle velocity. The first approach uses a vehicle kinetic or dynamic model which requires information about a vehicle's parameters, such as vehicle mass, center of gravity, wheel radius, and wheel cornering stiffness. The second approach uses a kinematic model without considering vehicle dynamics or vehicle parameters.

Use of the vehicle kinetic model generally requires certain assumptions. One such assumption is that the tires of the vehicle are operating within a linear region of known vehicle parameters. For example, kinetic models generally assume a standard tire cornering stiffness. However, this assumption is accurate only for the assumed tire and road surface conditions thereby oversimplifying vehicle dynamics. For an accurate velocity estimation, the method should take into account vehicle dynamics for driving conditions different from the assumed tire and road conditions.

To correct some of the problems associated with lateral velocity estimation based on vehicle dynamics, some methods use a combined state and parameter estimation which attempts to estimate road conditions as well as the lateral velocity. One problem with a combined state and parameter estimation method is that it requires persistent excitation of the desired sensors for parameter convergence. Persistence of excitation is a well known condition required for parameter convergence. More specifically, persistence of excitation is the relation between the richness of the reference signals and the parameter convergence, therefore, the estimated parameters will not converge to the ideal values unless the reference signal or signals satisfy certain conditions. Persistent excitation of the sensors to estimate the vehicle lateral velocity is difficult to achieve because the sensors may not always provide a reading during normal vehicle operation. For example, while at a constant longitudinal velocity with no movement in the lateral direction, the signal received from the accelerometer is generally zero or no signal. Yet another problem is that any signal present during normal vehicle operation may be small and overshadowed by noise inherent in the sensor. Undesirable signal to noise ratios may occur from bumpy, banked, uneven, or slippery road surfaces as well as from vibration inherent in the vehicle and specifically the drivetrain. Another problem with traditional combined state and parameter methods is the need for the last known lateral velocity to estimate the current lateral velocity. If an error is present in the last known lateral velocity, the error generally increases with each cycle.

The second conventional method of determining lateral velocity, the kinematic model, does not consider vehicle kinetic dynamics and vehicle parameters. Kinematic models avoid unknown or time varying vehicle parameters in the estimation algorithm by using a simple kinematic relationship between sensors. The velocity is estimated by integrating accelerometer measurements. However, accelerometer measurements contain many different types of noises. In addition to the exemplary noises given above, the voltage levels or low-frequency component of a signal may drift over time causing the associated signal to be inaccurate. Further, in a kinematic model, the noise is integrated and therefore accumulates estimation errors.

SUMMARY OF THE INVENTION

In view of the above, the present invention is directed to a method and system for vehicle velocity estimation that calculates a noise covariance and uses the calculated noise covariance to determine the reliability of the estimated vehicle velocity.

The present invention effectively combines a vehicle kinetic model and a kinematic model to overcome the above discussed problems while preserving the advantages of each model. To minimize implementation cost, the present invention generally uses available sensors that may already be included in a vehicle or economically be added. Exemplary sensors include a wheel speed sensor, an accelerometer, a yaw rate sensor, and a steering angle sensor.

The system uses signals from the sensors to determine an approximated vehicle velocity, through known techniques. A noise covariance associated with the sensor signals and approximated velocities is then calculated. Selected sensor signals, calculated approximated velocities, and noise covariances are then input into an adaptive Kalman filter framework so that each sensor can be appropriately and systematically combined to result in an estimated vehicle velocity.

In a first embodiment the system for dynamically estimating longitudinal and lateral velocities for use in a vehicle stability control system of a vehicle includes a vehicle sensor producing a signal indicative of a vehicle travel state and a processor communicating with the vehicle sensor. The processor is generally configured to calculate an approximate velocity of the vehicle, determine a noise covariance associated with the sensor signal and approximated velocity, and estimate the velocity of the vehicle using the received vehicle sensor signal, approximated velocity, and the associated noise covariances.

In another embodiment, the system for estimating a velocity of a vehicle for use in a vehicle stability control system is used in a vehicle wherein the system includes an accelerometer for producing an acceleration signal, a wheel speed sensor producing a wheel speed signal, a yaw rate sensor producing a yaw rate signal, a steering wheel angle sensor producing a steering wheel angle signal, a brake position sensor producing a brake position signal, a position sensor producing a throttle position signal, and a processor. The processor communicates with a velocity calculation model which receives said wheel speed sensor signal to calculate an approximated velocity, a noise covariance module which receives the acceleration signal and at least one of the wheel speed, yaw rate, steering wheel angle, brake pedal, brake position, and throttle position signals to calculate a noise covariance associated with the approximated velocity and the acceleration signal. The noise covariance is generally inversely related to the reliability. The processor communicates with a Kalman filter module which uses a Kalman filter framework with the noise covariance, approximated velocity, and acceleration signal to determine an estimated velocity for use in the vehicle stability control system.

In a further embodiment, the method for estimating the velocity of a vehicle for use in a vehicle stability control system includes receiving sensor signals indicative of a vehicle travel state, calculating approximated velocity using the sensor signals, determining a noise covariance associated with the sensor signals and the approximated velocity, and estimating a vehicle velocity using a Kalman filter framework into which the noise covariance, approximated velocity, and certain sensor signals are input to provide a reliable estimated velocity.

Further scope of applicability of the present invention will become apparent from the following detailed description, claims, and drawings. However, it should be understood that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The present invention will become more fully understood from the detailed description given here below, the appended claims, and the accompanying drawings in which:

DETAILED DESCRIPTION OF THE PREFERRED EMBODIMENT

Modern vehicles contain an increasing number of control systems that operate to enhance driver control of the vehicle. These systems often depend on fast and accurate calculation of vehicle longitudinal and lateral velocities. The present invention provides a method and a system of using signals from multiple sensors, such as yaw rate sensors, accelerometers, and angular wheel speed sensors, to obtain accurate and reliable estimated longitudinal and lateral velocities.

The present invention provides an accurate and reliable velocity estimation by effectively combining a kinetic model of the vehicle dynamics and a kinematic model of the sensor signals. Specifically, the invention applies a sensor fusion method to the vehicle velocity estimation so that the reliability of sensor signals and calculated outputs may be assigned and applied differently to the kinetic model and kinematic model for different vehicle maneuvers.

The system 10 (FIG. 2) includes a plurality of vehicle sensors 102 communicating data signals indicative of vehicle states to a processor 12. The system is described below as having various processor modules to perform specific functions for ease of explanation, but may easily be accomplished by a processor without separate hardware or software modules. The processor 12 receives the signals from sensors 102 and calculates an approximated longitudinal velocity ($v_{ax}$) and approximated lateral velocity ($v_{ay}$) through known techniques. The processor 12 then determines a noise covariance ($R_x$, $Q_x$, $R_y$, $Q_y$) associated with selected signals or the approximated longitudinal and lateral vehicle velocities ($v_{ax}$, $v_{ay}$). The noise covariances ($R_x$, $Q_x$, $R_y$, $Q_y$) are also indicative of the reliability of the kinetic model. The noise covariances ($R_x$, $Q_x$, $R_y$, $Q_y$) may be broken into two parts, one associated with the measured values received by various sensor signals and the other with the approximated lateral and longitudinal velocities. The processor 12 uses the approximated velocities ($v_{ax}$, $v_{ay}$), selected vehicle data signals, and noise covariances ($R_x$, $Q_x$, $R_y$, $Q_y$) within a Kalman filter framework to determine the estimated longitudinal and lateral velocities ($\hat{v}_{tx}$, $\hat{v}_{ty}$). As in conventional systems, the estimated longitudinal and lateral velocities are communicated to a controller 31 to stabilize the vehicle. The Kalman filter framework is used as a baseline filter to systematically combine the velocity estimations from the kinetic model with the kinematic model. The noise covariances act as the filter gain in the Kalman filter framework.

Figure 1:
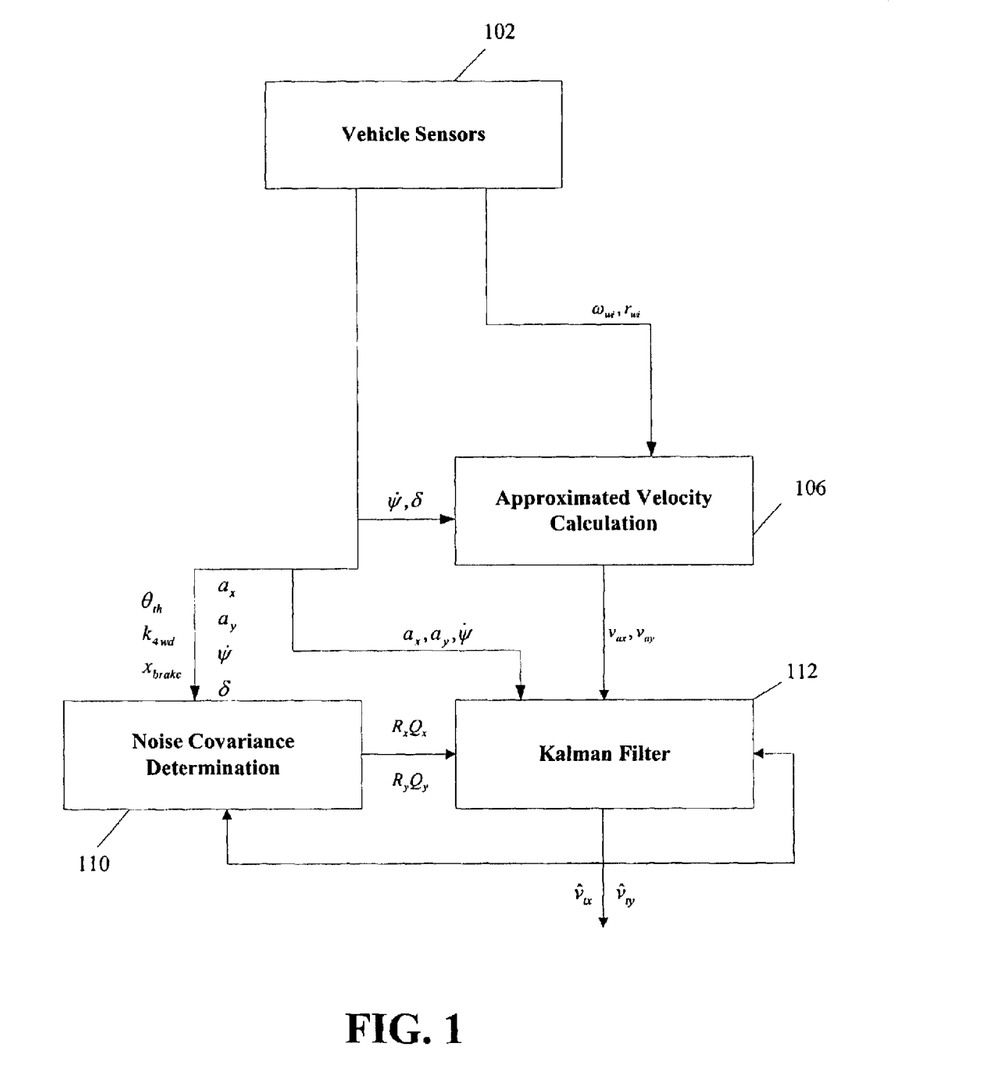
FIG. 1 is a schematic of the process for determining an estimated velocity for use in a vehicle stability control system according to the present invention.
Figure 2:
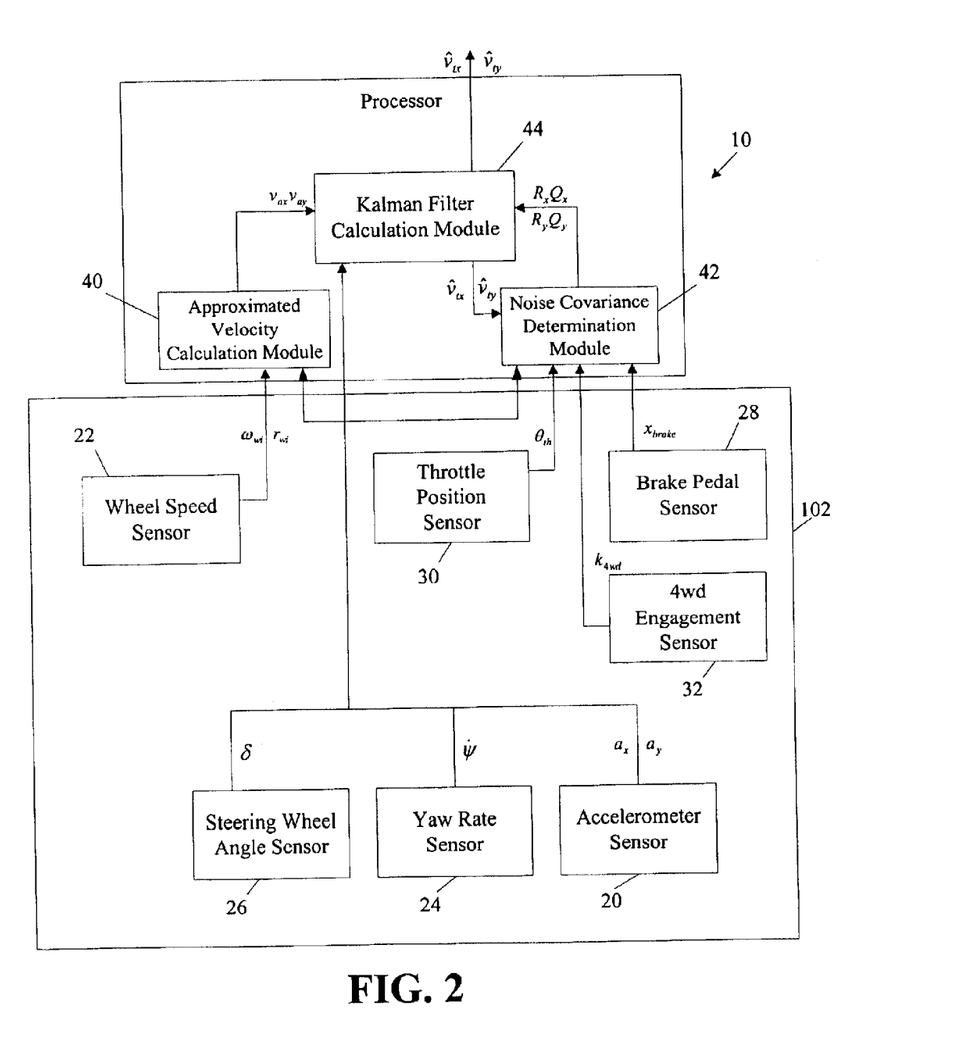
FIG. 2 is a diagram of the processor and related processes for determining an estimated velocity for use in a vehicle stability control system according to the present invention.

Turning now to a more detailed discussion of the system and method of the present invention, at least two vehicle sensors 102 produce signals indicative of a vehicle travel state (step 103) which are used by the processor 12 to calculate the approximated longitudinal and lateral velocities ($v_{ax}$, $v_{ay}$) of the vehicle. The processor 12 may be a typical microprocessor capable of performing the functions discussed above. One skilled in the art would understand how to provide a processor capable of performing the functions described below or how to modify existing vehicle stability control systems to accommodate the method and process described below. Of course, it should be readily recognized that separate circuit boards in communication with each other may perform the functions described in place of or in conjunction with a processor.

The vehicle sensors 102 typically provide data or sensor signals indicative of a vehicle travel state or the movement of the vehicle, such as angular wheel speed ($\omega_{wi}$), acceleration ($a_x$, $a_y$), and yaw rate ($\dot{\psi}$). These sensors 102 may include an accelerometer 20, wheel angular speed sensor 22, yaw rate sensor 24, steering wheel angle sensor 26, brake pedal position sensor 28, throttle position sensor 30, or other suitable sensors. As used herein, the phrase "sensor signals indicative of a vehicle travel state" is intended to encompass conventional sensing techniques, such as those described above as well as others that may be later developed.

An accelerometer 20 is generally placed near the center of the vehicle and provides data regarding the acceleration or deceleration of the vehicle. An accelerometer 20 typically measures the longitudinal acceleration ($a_x$) and lateral acceleration ($a_y$) of the vehicle. In some cases a separate longitudinal and lateral accelerometer may be used. The acceleration signal may include noise resulting from a variety of sources including vehicle vibrations, bumps in the road, incline of a road or bank of a road.

Angular wheel speed sensors 22, typically associated with each wheel of the vehicle, measure the angular speed ($\omega_{wi}$) of the wheel and provide an angular wheel speed signal to the processor 12 or a related module. Wheel speed sensors 22 are commonly used in traction control systems and anti-lock brake systems. Multiplying the angular wheel speed ($\omega_{wi}$) by the radius ($r_{wi}$) of that wheel may provide an approximation of the longitudinal velocity of the vehicle. Errors in the approximated longitudinal velocity can occur from wheel slip.

Yaw rate sensors 24 are typically used in conjunction with most vehicle stability control systems and provide data signals concerning the yaw or rotational movement ($\dot{\psi}$) of the vehicle. The yaw rate sensor 24 provides a yaw rate signal to the processor 12 or related modules.

The present invention may also include other sensors that provide data indicative of the driver's interaction with the vehicle. Exemplary sensors as described below in the illustrated embodiment include a brake pedal position sensor 28, a throttle position sensor 30, and a steering wheel angle sensor 26. The steering wheel angle sensor 26 provides a steering wheel angle signal regarding the steering wheel angle ($\delta_f$) to the processor 12. Steering wheel angle sensors 26 commonly measure the amount of rotation of the steering wheel, but may be configured to also measure the rate of rotation. Steering wheel angle sensors 26 allow the system to determine the amount that the vehicle wheels are offset from the longitudinal axis of the vehicle but other devices that measure wheel offset may also be used.

The brake pedal position sensor 28 provides a brake position signal regarding the braking state of the vehicle such as the amount that the brake pedal is offset from a rest position ($x_{brake}$). From known vehicle dynamics, an estimation of how much braking force is being applied may be determined from the amount of depression of the brake pedal. A device that measures the actual braking force may be used in place of, or in conjunction with, the brake pedal sensor 28. Although the brake pedal position sensor 28 is not common in vehicles, some modern vehicles using a brake-by-wire system may include a brake pedal position sensor that can provide the necessary data for the present invention.

The throttle position sensor 30 measures throttle opening angle conditions ($\theta_{th}$) and therefore can be used to check the accuracy of the acceleration signal provided by the accelerometer 20. The throttle position sensor 30 provides a throttle position signal to the processor 12 or related module. The throttle position sensor 30 may be used in modern vehicles with drive by wire or electronic engine spark control. A throttle position sensor 30 may instead measure the amount of force and depression of a throttle pedal, which can be related to the throttle angle.

Other sensors that may be useful in the present invention include GPS systems, four-by-four engagement sensors 32, and the like. Four-by-four engagement is helpful for four-wheel drive vehicles because a vehicle may have different vehicle dynamics in four-wheel drive mode. For some vehicles, the four-by-four engagement may introduce a variable ($k_{4wd}$) to the calculations that represents the torque distribution ratio when the four-wheel drive is engaged. The four wheel drive sensor provides a four-wheel drive engagement signal to the processor 12 or related module when the four-wheel drive mode is engaged so that the longitudinal approximated velocity ($v_{ax}$) may be calculated by a method other than the wheel angular velocity ($\omega_{wi}$) because all the wheels are driven, making it difficult to determine if a wheel is slipping. A GPS sensor may provide a signal that may be used in determining the vehicle's approximated velocity, acceleration of the vehicle, and the direction from the longitudinal or lateral axis of the vehicle. Although the accuracy of current GPS systems limit their suitability for use with the present invention, as the accuracy improves such systems may replace the accelerometer and wheel speed sensors.

Figure 4:
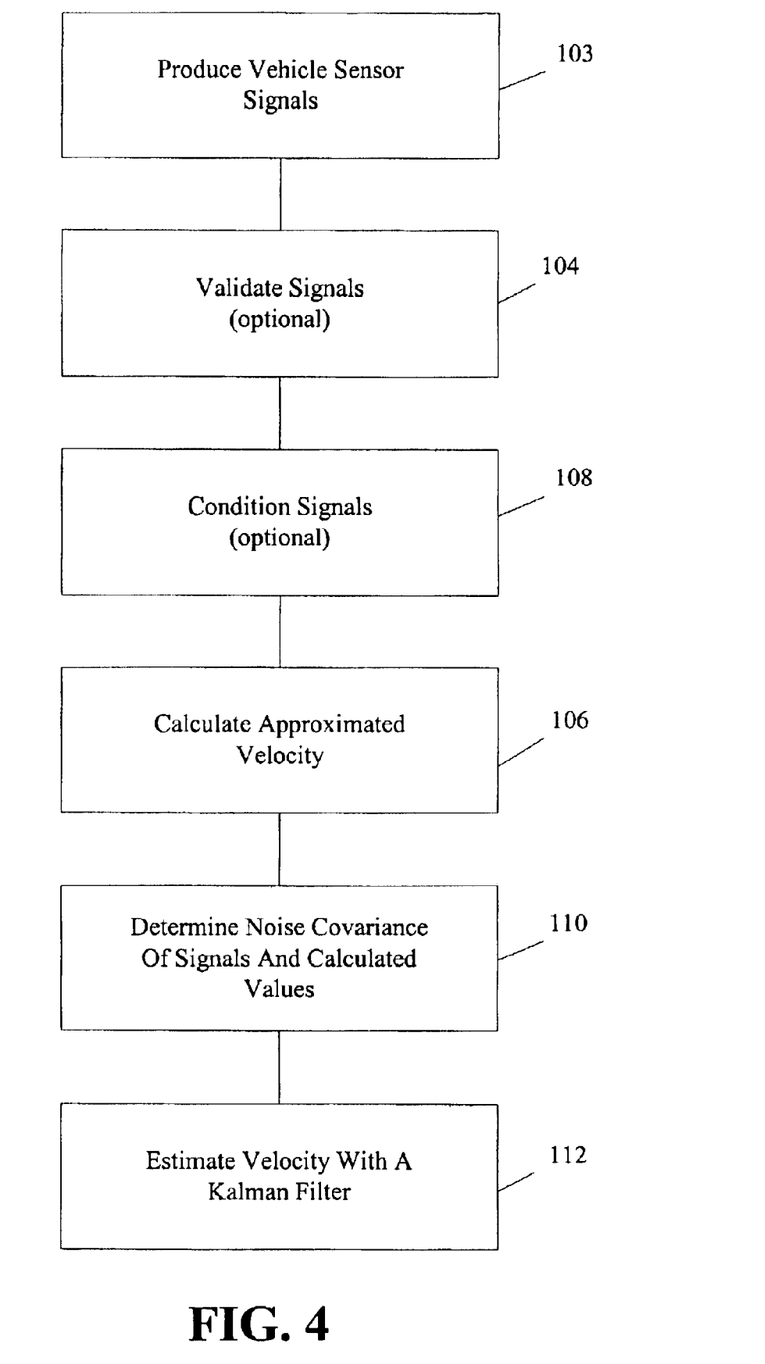
FIG. 4 is a flow chart of the method steps for determining an estimated velocity for use in a vehicle stability control system according to the present invention.

An overview of the method steps for estimating the velocity of a vehicle for use in systems such as vehicle stability control systems is shown in FIG. 4. After receiving signals from various sensors (Step 103), the processor 12 determines the longitudinal approximated velocity ($v_{ax}$) and the lateral approximated velocity ($v_{ay}$) of the vehicle in a conventional manner (Step 106). The processor 12 is illustrated in FIG. 2 to include a velocity calculation module 40 configured to calculate the approximated velocity, but an independent circuit board or any other known device may act as the velocity calculation module.

In calculating the approximated lateral and longitudinal velocities, the present invention uses both a kinematic and kinematic or dynamic model. For ease of explanation, the kinematic model will first be described followed by the dynamic model, even though the kinematic model described below in Equations (1) and (2) uses the longitudinal and lateral approximated velocities, ($v_{ax}$, $v_{ay}$) determined in the dynamic model. The longitudinal and lateral vehicle velocity approximation can be obtained from a simple vehicle longitudinal and lateral kinematic model of vehicle velocity and acceleration, which can be described as:

$$\frac{dv_{tx}}{dt} = \dot{\psi} v_{ty} + a_x + q_x \quad (1)$$

$$\frac{dv_{ty}}{dt} = -\dot{\psi} v_{tx} + a_y + q_y$$

$$v_{ax} = v_{tx} + r_x \quad (2)$$

$$v_{ay} = v_{ty} + r_y$$

where $v_{tx}$ and $v_{ty}$ are the true longitudinal and lateral velocities of the vehicle's center of gravity, where $$\frac{dv_{tx}}{dt} \text{ and } \frac{dv_{ty}}{dt}$$

represent the time derivative of the true lateral and longitudinal velocities, which generally represent the acceleration in the respective direction, $v_{ax}$ and $v_{ay}$ are the approximated longitudinal and lateral velocities of the center of gravity of the vehicle, $a_x$ and $a_y$ are the measured longitudinal and lateral acceleration of the vehicle's center of gravity, $\dot\psi$ is measured change in the yaw rate with respect to a specified time period, $q_x$ and $q_y$ are the process noises (which represent the measurement noises associated with the accelerometers), $r_x$ and $r_y$ are the measurement noises (which represent the errors associated with the approximated velocities). A subscript "x" and "y" indicate the longitudinal and lateral directions, respectively. As described in greater detail below, measured sensor signals often contain high frequency noises and offsets, and a signal conditioning process with low pass filters and dynamic offset compensation, may be used to condition $\dot\psi$, $a_x$, and $a_y$ from the raw measurements to provide more accurate measurement signals. Equations (1) and (2) show the kinematic model of acceleration and velocity. Discrete time system equation can be obtained by discretizing Equations (1) and (2) as follows:

$$x_{k+1} = A_k x_k + B u_k + B_q q_k \tag{3}$$

$$y_k = C x_k + r_k$$

$$x_k = \begin{Bmatrix} v_{tx_k} \\ v_{ty_k} \end{Bmatrix}, u_k = \begin{Bmatrix} a_{fx_k} \\ a_{fy_k} \end{Bmatrix},$$

$$q_k = \begin{Bmatrix} q_{xk} \\ q_{yk} \end{Bmatrix}, y_k = \begin{Bmatrix} v_{ax_k} \\ v_{ay_k} \end{Bmatrix}, r_k = \begin{Bmatrix} r_{xk} \\ r_{yk} \end{Bmatrix}$$

$$A_k = \begin{bmatrix} 1 & T\dot\psi_k \\ -T\dot\psi_k & 1 \end{bmatrix}, B = \begin{bmatrix} T & 0 \\ 0 & T \end{bmatrix},$$

$$B_q = \begin{bmatrix} T & 0 \\ 0 & T \end{bmatrix}, C = \begin{bmatrix} 1 & 0 \\ 0 & 1 \end{bmatrix}$$

where T is the sampling period, the subscript k denotes the current variable while k+1 denotes the variable associated with the next cycle value, and $q_x$ and $q_y$ are the process noises, which represent the measurement noises associated with the accelerometers. The physical model, which is derived from the vehicle dynamics, will be described in greater detail below.

As discussed above, the velocity calculation module 40 is configured to calculate the longitudinal approximated velocity ($v_{ax}$) and lateral approximated velocities ($v_{ay}$) using vehicle dynamics. In the illustrated embodiment, the longitudinal approximated velocity ($v_{ax}$) is calculated by multiplying the angular velocity ($\omega_{wi}$) of the wheel by the known radius or diameter of the wheel. While the wheel speed sensors 22 may provide a suitable approximation of the longitudinal velocity ($v_{ax}$) of a vehicle under ideal conditions, the accuracy of this approximation decreases during high acceleration or deceleration conditions as well as when the vehicle is traveling on less than ideal surfaces (e.g., wet surfaces, snow, ice, gravel, etc.). Therefore, as described above, the approximated velocity is used in conjunction with the kinematic model described above in Equations (1) and (2). In general, $r_x$ in Equation (1) and $r_{xk}$ in Equation (3) account for the wheel slip, which is the difference between the longitudinal true vehicle velocity ($v_{tx}$) and the longitudinal approximated velocity ($v_{ax}$) determined based on the wheel speed sensors. The longitudinal measurement noise covariance, $R_x$, discussed below, is used to indicate the reliability of the longitudinal approximated velocity ($v_{ax}$) and in the illustrated embodiment, the higher the potential for wheel slip, the larger the longitudinal noise covariance ($R_x$) as well as lower reliability on the longitudinal approximated velocity ($v_{ax}$).

The velocity calculation module 40 also uses a dynamic model to calculate the lateral approximated velocity ($v_{ay}$). Because there are no velocity measurements in the lateral direction, such as the wheel speed for the longitudinal direction, the calculation of the approximated lateral velocity ($v_{ay}$) is more complex. By way of a non-limiting example, in the illustrated embodiment, the dynamic lateral velocity ($v_{dy}$) calculated with the dynamic model is calculated using a Luenberger observer model, derived from a linear bicycle vehicle model where the dynamics of the left and right side of the vehicle are assumed to be identical. The Luenberger model used in the present invention is a simplified dynamic model and generally assumes that the steering angle is small and that the longitudinal traction force is zero. The discretized vehicle lateral motion of the linear bicycle vehicle model can be described as:

$$\begin{Bmatrix} v_{dy_{k+1}} \\ \dot\psi_{k+1} \end{Bmatrix} = \begin{bmatrix} 1 - T\frac{2C_f + 2C_r}{m v_{ax}} & -T v_{ax} - T\frac{2C_f l_f - 2C_r l_r}{m v_{ax}} \\ -T\frac{2C_f l_f - 2C_r l_r}{I_z v_{ax}} & 1 - T\frac{2C_f l_f^2 + 2C_r l_r^2}{I_z v_{ax}} \end{bmatrix} \tag{4}$$

$$\begin{Bmatrix} v_{dy_k} \\ \dot\psi_k \end{Bmatrix} + \begin{bmatrix} T\frac{2C_f}{m} \\ T\frac{2C_f l_f}{I_z} \end{bmatrix} \delta_{f_k}$$

$$y_k = \begin{bmatrix} 0 & 1 \end{bmatrix} \begin{Bmatrix} v_{dy_k} \\ \dot\psi_k \end{Bmatrix} \tag{5}$$

where $v_{dy}$ is the vehicle lateral velocity calculated in the dynamic model, $\delta_f$ is the measured front wheel steering angle, $\dot\psi$ is the measured yaw rate with respect to a specified time period, $C_f$ is the cornering stiffness of the front tires, $C_r$ is the cornering stiffness of the rear tires, m is the vehicle mass, $I_z$ is the yaw moment of inertia of the vehicle about its center of gravity, $l_f$ is the distance from the center of gravity to the front axle, and $l_r$ is the distance from the center of gravity to the rear axle. Real world or laboratory testing or modeling may be used to determine variables $C_f$, $C_r$, m, $l_f$, $l_r$ and $I_z$, which then may be stored in processor memory or the associated module memory. Therefore, the lateral approximated velocity ($v_{ay}$) can be obtained from a simplified discrete time Luenberger observer model as follows:

$$\begin{Bmatrix} \hat v_{dy_{k+1}} \\ \hat{\dot\psi}_{k+1} \end{Bmatrix} = \begin{bmatrix} 1 - T\frac{2C_f + 2C_r}{m v_{ax}} & -T v_{ax} - T\frac{2C_f l_f - 2C_r l_r}{m v_{ax}} \\ -T\frac{2C_f l_f - 2C_r l_r}{I_z v_{ax}} & 1 - T\frac{2C_f l_f^2 + 2C_r l_r^2}{I_z v_{ax}} \end{bmatrix} \tag{6}$$

$$\begin{Bmatrix} \hat v_{dy_k} \\ \hat{\dot\psi}_k \end{Bmatrix} + \begin{bmatrix} T\frac{2C_f}{m} \\ T\frac{2C_f l_f}{I_z} \end{bmatrix} \delta_{f_k} + \begin{bmatrix} L_1 \\ L_2 \end{bmatrix} (\dot\psi_k - \hat{\dot\psi}_k)$$

$$v_{ay_k} = \hat v_{dy_k} \tag{7}$$

where $L_1$, and $L_2$ are the observer gain.

In general, $r_{yk}$ in equation (3) accounts for the modeling errors contained in the model based estimator, such as unmodeled dynamics and parameter inaccuracies. Of particular interest are modeling errors related to the tire cornering stiffnesses, $C_f$ and $C_r$, which are assumed to be constant in the model. Because the tire cornering stiffnesses depend on the tire and road surface conditions, they vary with time. The possible variation of the approximated lateral velocity can be several times its nominal value depending on the tire and road conditions. Therefore, the lateral measurement noise covariance, $R_y$, is used to indicate the reliability of the approximated lateral velocity. The more vehicle operation conditions, including the road surface conditions, deviate from the modeled operation conditions, the lower the reliability of the lateral approximated velocity ($v_{ay}$). Of course, the velocity calculation module 40 may be configured to use other suitable techniques for approximating the lateral velocity ($v_{ay}$) of a vehicle, including currently known or later developed techniques.

The processor 12 is also shown in FIG. 2 to include a noise covariance module 42 (FIG. 2) which determines (step 110) noise covariances ($R_x$, $Q_x$, $R_y$, $Q_y$) associated with the measured data signals and with the approximated lateral and longitudinal velocities ($v_{ax}$, $v_{ay}$). In general, the noise covariances ($R_x$, $Q_x$, $R_y$, $Q_y$) relate to the reliability of the signals or approximated velocities. In the embodiment described herein, the magnitude of the noise covariance is inversely related to the reliability of the measurement or signal. That is, the noise covariance increases as the reliability decreases. Of course, one skilled in the art would readily recognize the relationships may be mathematically configured so that as the noise covariance increases so does the reliability. In order to improve the effectiveness of the noise covariance consideration, the illustrated embodiment separates the noise covariance into system noise covariances ($Q_x$, $Q_y$) related to the amount of noise in the acceleration signals and measurement noise covariances ($R_x$, $R_y$) related to the noise or reliability of the approximated velocities. The longitudinal measurement noise covariance, $R_x$, indicates the reliability of the longitudinal kinetic model, the longitudinal system noise covariance, $Q_x$, indicates the reliability of the longitudinal kinematic model, the lateral measurement noise covariance, $R_y$, indicates the reliability of the lateral kinetic model, and the lateral system noise covariance, $Q_y$, indicates the reliability of the lateral kinematic model. In the illustrated example, as outlined in more detail below, the noise covariance is generally inversely related to the lower the reliability of the signal or approximated velocities.

As is more fully explained below, the noise covariance module 42 considers the relationship between vehicle maneuvers and the expected noise covariances to determine the noise covariance ($R_x$, $Q_x$, $R_y$, $Q_y$). By considering the relationship of the vehicle signals and the approximated velocities, rather than using a predetermined fixed noise covariance, the noise covariance module 42 may provide a real-time estimation of the noise covariance ($R_x$, $Q_x$, $R_y$, $Q_y$). More specifically, the noise covariance ($R_x$, $Q_x$, $R_y$, $Q_y$) is determined for certain signals or approximated values by the relationship of the signals or approximated values to expected relationships based on vehicle dynamics. The noise covariances of the sensor measurements are typically the sum of the cross products of the two deviations from the mean. Therefore, as the signal noise increases, the noise covariance also increases. Because the noise covariance is typically time-varying and generally not known, the noise covariances are not estimated by an adaptive algorithm but determined based on knowledge of vehicle dynamics gained through real world tests, computer modeling, or other means.

During vehicle operation each received sensor signal and each calculated value generally signify vehicle operating states. By way of a further non-limiting explanation, each sensor signal and calculated value may be reviewed to determine if that sensor signal or calculated value is consistent with related sensor signals or calculated values. For example, the processor may determine that the longitudinal acceleration signal has a high reliability when at least one of the throttle position signal and the brake position signal indicate a vehicle operating state consistent with the received longitudinal acceleration signal. The processor may also determine that the lateral acceleration signal has a high reliability when at least one of the steering wheel angle signal and the yaw rate signal indicate a vehicle operating state consistent with the received lateral acceleration signal. Further, the processor may determine that the longitudinal approximated velocity has a high reliability when at least one of the throttle position signal and said brake position signal indicate a vehicle operating state consistent with the calculated longitudinal approximated velocity. The processor may also determine that the lateral approximated velocity has a high reliability when at least one of the steering wheel angle signal and the yaw rate signal indicate a vehicle operating state consistent with the longitudinal approximated velocity.

Each sensor signal and calculated value may include a normal operating range which may be determined from vehicle testing or modeling. The normal operating range is generally the range from the minimum to maximum value of a signal or calculated value. Signals outside the normal operating range may be optionally classified as invalid and discarded as described in greater detail below. The relationship of various signals and calculated values and their interrelationship during certain vehicle operating states vary with the vehicle operating states and are generally determined through real world testing by determining the coefficients associated with the noise covariance calculations. For example, during vehicle acceleration a primary longitudinal acceleration signal may be received that signifies the acceleration or deceleration of the vehicle at a certain rate of acceleration. It is expected that a secondary signal such as the throttle sensor signal or brake sensor signal will provide a corresponding signal to give a noise covariance associated with the longitudinal acceleration signal. If one of the secondary signals does not verify the primary signal, it is generally assumed that the primary signal is not reliable. To adjust the noise covariance equations, described in greater detail below, the coefficients are set based on testing or modeling each vehicle.

The relationships between the signals and noise covariance will be described in greater detail below and the references to the terms low, small, high, or large do not refer to an absolute value but rather the relationship of the signals, and where that signal is expected within the normal range. In the following examples, a specific value of one signal is not as important in determining the reliability of another signal or calculated as the overall relationships of the signals provided by the sensors and calculated values. Further non-limiting examples of specific vehicle operating conditions and the associated signals as well as calculated noise covariances and reliability are provided below, Additional relationships based on vehicle operating conditions may easily be made without departing from the spirit of the invention. For example, in instances where the vehicle acceleration is small, the reliability of the acceleration signal is expected to be low because of the low signal-to-noise ratio and bias offset. In such as case, the noise covariance module 42 assigns a smaller confidence to the acceleration measurements by generating large system noise covariances ($Q_x$, $Q_y$) and small measurement noise covariances ($R_x$, $R_y$). In comparison, if the vehicle is accelerating quickly, a high probability of tire skid or slip exists, and the approximated longitudinal velocity calculated from the angular wheel speed may be different from the actual vehicle longitudinal velocity and the tire cornering stiffness may vary from the expected values. Upon receiving signals indicative of large vehicle acceleration, the noise covariance module 42 assigns high confidence to the acceleration measurements or more specifically, kinematic model, and low confidence to the approximated velocity. Therefore, as illustrated below, the processor 12 generates small system noise covariances ($Q_x$, $Q_y$) and large measurement noise covariances ($R_x$, $R_y$) for the above example. More specifically, each of the signals and calculated values may include an expected range including, but not limited to, a longitudinal acceleration signal range, lateral acceleration signal range, throttle pedal signal range, brake pedal signal range, steering wheel angle signal range, and yaw rate signal range. A large longitudinal acceleration signal from the accelerometer 20 may indicate high longitudinal acceleration ($a_x$) but may also indicate that the tires are slipping thereby notifying the system that an approximated longitudinal velocity calculated from the angular wheel speed ($\omega_{wi}$) may be different than the vehicle's actual longitudinal velocity. Another exemplary relationship is that when the lateral acceleration ($a_y$) signal from the accelerometer 20 indicates a high lateral acceleration, the tire cornering stiffness may vary from its nominal value, thereby affecting the approximated lateral velocity calculated from the Luenberger observer model. Yet another exemplary relationship is where the accelerometer 20 provides a signal not consistent with signals from other sensors such as the yaw rate, throttle angle, brake position, and steering wheel angle. Accelerometers 20 do not always provide accurate acceleration signals because an accelerometer measures not only the acceleration of the vehicle but also gravitational acceleration changes due to vehicle attitude changes. For example, an accelerometer signal does not reflect differences between motion and tilt because the acceleration measurement generally includes the sum of the motional acceleration and the gravitational acceleration. More specifically, if the throttle angle and brake pedal have relatively small values while the longitudinal acceleration measurement has a relatively large value, the system may determine that the car is on a slope. Similarly, if the steering wheel angle and yaw rate have relatively small values with a relatively large lateral acceleration, the system may determine that the car is inclined, lateral, such as on a banked road. Other exemplary relationships may be determined from laboratory or real world testing. The noise covariance module 42 may use a functional relationship or a look-up table to determine noise covariances associated with various vehicle states. In the illustrated embodiment, the noise covariance is primarily calculated through a functional relationship.

In the illustrated embodiment, the noise covariance module 42 uses Equations (8)–(11) listed below to determine the noise covariance ($R_x$, $Q_x$, $R_y$, $Q_y$), respectively. The noise covariance relationships set fourth in equations (8)–(11) below, illustrate that each noise covariance takes into account the magnitude of sensor readings that are indicative of a common vehicle operating state. For example, the longitudinal measurement noise covariance, ($R_x$) and the longitudinal system noise covariance, ($Q_x$), are each the mathematical sum of three values—each value being an exponential function of one of an acceleration, throttle position and brake position. The summed values each also include a constant (i.e., $C_{rxj}$ and $C_{qxj}$). The constants, as described above, are selected such that the magnitude of the covariance is "low" ("high reliability") if the acceleration measurement from the accelerometer and at least one of the other measured values are indicative of the same vehicle operating state. For example, if the accelerometer indicates that the vehicle is accelerating and at least one of the throttle sensor or brake sensor provides a confirming indication of acceleration, Equations (8)–(9) provide a "low" noise covariance and therefore a "high reliability". Conversely, if both the throttle and brake sensor readings are inconsistent with the acceleration reading, the exponential equations generate a "high" noise covariance indicating "low reliability". The noise covariances are calculated as follows:

$$R_x = c_{rx1} \exp\left(c_{rx2} \cdot |a_x| \cdot \frac{k_{4wd}}{100}\right) + \qquad (8)$$
$$c_{rx3} \exp\left(c_{rx4} \cdot \theta_{th} \cdot \frac{k_{4wd}}{100}\right) + c_{rx5} \exp(c_{rx6} \cdot x_{brake});$$

$$Q_x = \qquad (9)$$
$$c_{qx1} \exp(-c_{qx2} \cdot |a_x|) + c_{qx3} \exp(-c_{qx4} \cdot \theta_{th}) + c_{qx5} \exp(-c_{qx6} \cdot x_{brake});$$

$$R_y = c_{ry1} \exp(c_{ry2} \cdot |a_y|) + c_{ry3} \exp(c_{ry4} \cdot |\delta| + c_{ry5} \cdot |\dot{\psi}|); \text{ and} \qquad (10)$$

$$Q_y = c_{qy1} \exp(-c_{qy2} \cdot |a_y|) + c_{qy3} \exp(-c_{qy4} \cdot |\delta| - c_{qy5} \cdot |\dot{\psi}|). \qquad (11)$$

In equations (8)–(11), $\theta_{th}$ is the throttle angle, $x_{brake}$ is the brake pedal travel, $k_{4wd}$ is the 4WD control parameter related with torque distribution ratio, and $C_{qxi}$, $C_{rxi}$, $c_{gyi}$, and $c_{ryi}$ are positive real parameters determined through laboratory computer modeling or real world vehicle tests. As seen in equations (8)–(11), the functional relationship of the noise covariance is generally exponential but other functional relationships may be used.

Returning to the flow chart of FIG. 2, once the processor 12 determines the noise covariances, the processor communicates these values to a Kalman filter framework which calculates an estimated longitudinal velocity and an estimated lateral velocity (step 112). A Kalman filter module 44 which may be located within the processor 12 receives the longitudinal and lateral accelerations ($a_x$, $a_y$), the yaw rate ($\dot{\psi}$), and the longitudinal and lateral approximated velocities ($v_{ax}$, $v_{ay}$) plus any other signals helpful in calculating the estimated velocities. Kalman filters are well known in the art for providing reliable state estimates in noisy environments. The Kalman filter is an unbiased estimator equation which minimizes the one-step predictor error covariance and includes the noise in the estimator gain. In the present invention, the Kalman filter framework used by the Kalman filter module 44 replaces the typical noise input with the noise covariance calculated in Equations (8)–(11). The estimated longitudinal and lateral absolute velocities of a vehicle can be decided by the following Kalman filter equations.

$$\hat{x}_{k+1|k} = (A_k - K_k)\hat{x}_{k|k-1} + K_k y_k + T u_k \qquad (12)$$

$$K_k = A_k M_k (M_k + R_k)^{-1} \qquad (13)$$

$$M_{k+1} = \bar{A}_k M_k \bar{A}_k^T + K_k R_k K_k^T + T^2 Q_k \quad M_0 = X_0 \qquad (14)$$

$$\bar{A}_k = A_k - K_k \qquad (15)$$

where $$Q_k = \begin{bmatrix} Q_{xk} & 0 \\ 0 & Q_{yk} \end{bmatrix}$$

is the system noise covariance matrix, $$R_k = \begin{bmatrix} R_{xk} & 0 \\ 0 & R_{yk} \end{bmatrix}$$

is the measurement noise covariance matrix, and $$\hat{x}_{k|k-1} = \begin{Bmatrix} \hat{v}_{rx_{k|k-1}} \\ \hat{v}_{ry_{k|k-1}} \end{Bmatrix}$$

where $\hat{v}_{rx_{k|k-1}}$ is the estimated longitudinal velocity and $\hat{v}_{ry_{k|k-1}}$ is the estimated lateral velocity.

Figure 3:
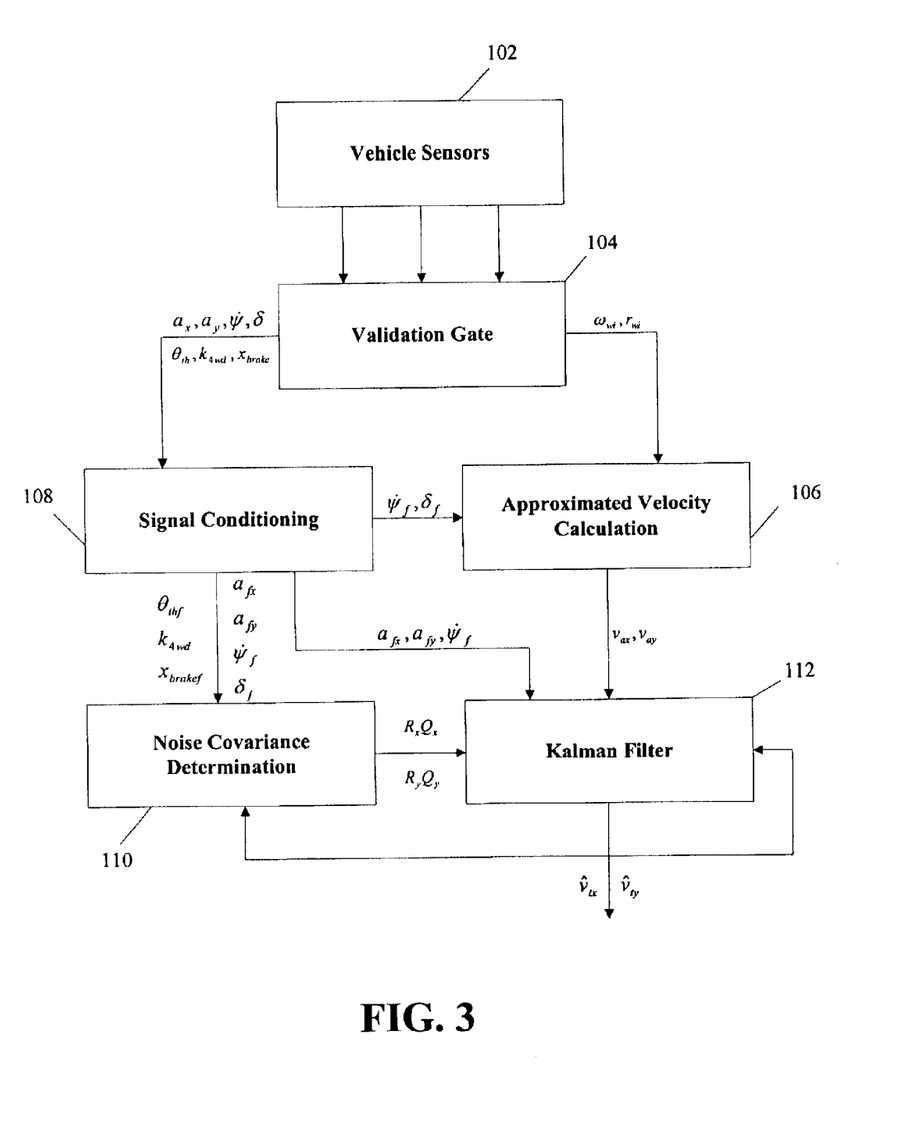
FIG. 3 is a schematic of an alternative process for determining an estimated velocity for use in a vehicle stability control system according to the present invention.

As an optional step, illustrated in FIG. 3, the signals may be validated at step 104 to detect a sensor failure or eliminate any sensor signals outside of a normal range. The term normal range generally refers to the range of the signal that each sensor will produce during normal operating maneuvers. These ranges may be determined through real world testing or vehicle modeling. The normal range for sensor signals on a particular vehicle may be determined in laboratory bench tests, real world tests, vehicle modeling, or by any other means. If the signals lie within the range, those signals are considered valid while those outside are discarded.

Also as an optional step and illustrated in FIG. 3, the signals may be conditioned or filtered at step 108 to reduce or alleviate variations or bad signals. The signal conditioning may be done through a variety of means that are well known in data processing. As an example, a simple low pass filter can be used for this purpose. For example, in Equation (2), $a_{fx}$ and $a_{fy}$, which represent the filtered acceleration measurements, may be used in place of $a_x$ and $a_y$ with the subscript "f" representing the filtered signal.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A system for dynamically estimating longitudinal and lateral velocities of a vehicle comprising:
   a vehicle sensor producing a signal indicative of a vehicle state; and
   a processor communicating with said vehicle sensor and configured to receive said signal, said processor further configured to:
      calculate an approximated velocity of the vehicle;
      determine a noise covariance associated with said signal and said approximated velocity; and
      estimate the velocity of said vehicle using said signal, said approximated velocity and said noise covariance.

2. The system of claim 1 wherein said vehicle sensor is a wheel speed sensor and said signal is an angular wheel speed signal, said angular wheel speed signal being communicated to said processor.

3. The system of claim 2 wherein said approximated velocity includes an approximated longitudinal velocity and an approximated lateral velocity.

4. The system of claim 3 further including an accelerometer producing a longitudinal acceleration signal and a lateral acceleration signal, said lateral and longitudinal acceleration signals being communicated to said processor for use in determining said noise covariance and said estimated velocity.

5. The system of claim 4 further including a yaw rate sensor producing a yaw rate signal and a steering wheel angle sensor producing a steering wheel angle signal, said yaw rate signal and said steering wheel angle signals being communicated to said processor for use in calculating said approximated lateral velocity and determining said noise covariance.

6. The system of claim 5 further including a brake sensor producing a brake position signal and a throttle sensor producing a throttle position signal, said brake position signal and said throttle position signal being communicated to said processor for use in determining said noise covariance.

7. The system of claim 6 further including a four wheel drive engagement sensor producing a four wheel drive engagement signal, said four wheel drive engagement signal being communicated to said processor for use in determining said noise covariance.

8. The system of claim 1 wherein said estimated velocity includes a lateral estimated velocity and a longitudinal estimated velocity, and said Kalman filter module uses a Kalman filter framework to determine said lateral and longitudinal estimated velocities.

9. The system of claim 8 wherein said estimated velocities are defined by:

$$\hat{x}_{k+1} = (A_k - K_k)\hat{x}_{k|k-1} + K_k Y_k + T u_k$$

$$K_k = A_k M_k (M_k + R_k)^{-1}$$

$$M_{k+1} = \bar{A}_k M_k \bar{A}_k^T + K_k R_k K_k^T + T^2 Q_k \quad M_0 = X_0$$

$$\bar{a}_k = A_k - K_k$$

wherein $$Q_k = \begin{bmatrix} Q_{xk} & 0 \\ 0 & Q_{yk} \end{bmatrix}, R_k = \begin{bmatrix} R_{xk} & 0 \\ 0 & R_{yk} \end{bmatrix}, \hat{x}_{k|k-1} = \begin{Bmatrix} \hat{v}_{rx_{k|k-1}} \\ \hat{v}_{ry_{k|k-1}} \end{Bmatrix},$$

and wherein $\hat{v}_{rx_{k|k-1}}$ is the estimated longitudinal velocity and $\hat{v}_{ry_{k|k-1}}$ is the estimated lateral velocity.

10. A system for dynamically estimating longitudinal and lateral velocities of a vehicle comprising:
   a wheel speed sensor producing an angular wheel speed signal indicative of a vehicle state;
   an accelerometer producing a longitudinal acceleration signal and a lateral acceleration signal;
   a yaw rate sensor producing a yaw rate signal;
   a steering wheel angle sensor producing a steering wheel angle signal;
   a brake sensor producing a brake position signal;
   a throttle sensor producing a throttle position signal; and
   a processor communicating with said wheel speed sensor and said accelerometer and wherein said processor is configured to receive said wheel speed signal, said lateral acceleration signal and said longitudinal acceleration signal, said processor further configured to:
      calculate an approximated longitudinal velocity;
      calculate an approximated lateral velocity of the vehicle using said yaw rate signal and said steering wheel angle signal;
      determine a noise covariance associated with said signal and said approximated velocity using said longitudinal acceleration signal, said lateral acceleration signal, said yaw rate signal, said brake position signal, said throttle position signal and said steering wheel angle signal, said noise covariance including a longitudinal system noise covariance, a lateral system noise covariance, a longitudinal measurement noise covariance, and a lateral measurement noise covariance, and wherein said longitudinal system noise covariance is inversely related to the reliability of said longitudinal acceleration signal, said lateral system noise covariance is inversely related to the reliability of said lateral acceleration signal, said longitudinal measurement noise covariance is inversely related to the reliability of said approximated longitudinal velocity, and said lateral measurement noise covariance is inversely related to the reliability of said approximated lateral velocity; and estimate the velocity of said vehicle using said signal, said approximated velocity and said noise covariance.

11. The system of claim 10 wherein said longitudinal acceleration signal has a high reliability when at least one of said throttle position signal and said brake position signal indicate a vehicle operating state consistent with said longitudinal acceleration signal.

12. The system of claim 10 wherein said lateral acceleration signal has a high reliability when at least one of said steering wheel angle signal and said yaw rate signal indicate a vehicle operating state consistent with said lateral acceleration signal.

13. The system of claim 10 wherein said longitudinal approximated velocity has a high reliability when at least one of said throttle position signal and said brake position signal indicate a vehicle operating state consistent with said longitudinal approximated velocity.

14. The system of claim 10 wherein said lateral approximated velocity has a high reliability when at least one of said steering wheel angle signal and said yaw rate signal indicate a vehicle operating state consistent with said longitudinal approximated velocity.

15. The system of claim 10 wherein said longitudinal system noise covariance $Q_x$ is defined by:

$$Q_x = c_{qx1}\exp(-c_{qx2}\cdot|a_x|) + c_{qx3}\exp(-c_{qx4}\cdot\theta_{th}) + c_{qx5}\exp(-c_{qx6}\cdot x_{brake});$$

said longitudinal measurement noise covariance $R_x$ is defined by $$R_x = c_{rx1}\exp\left(c_{rx2}\cdot|a_x|\cdot\frac{k_{4wd}}{100}\right) + c_{rx3}\exp\left(c_{rx4}\cdot\theta_{th}\cdot\frac{k_{4wd}}{100}\right) + c_{rx5}\exp(c_{rx6}\cdot x_{brake});$$

said lateral system noise covariance $Q_y$ is defined by $$Q_y = c_{qy1}\exp(-c_{gy2}\cdot|a_y|) + c_{qy3}\exp(-c_{qy4}\cdot|\delta| - c_{qy5}\cdot|\dot\psi|); \text{ and}$$

said lateral measurement noise covariance $R_y$ is defined by $$R_y = c_{ry1}\exp(c_{ry2}\cdot|a_y|) + c_{ry3}\exp(c_{ry4}\cdot|\delta| + c_{ry5}\cdot|\dot\psi|).$$

16. A method of estimating a velocity of a vehicle comprising:

receiving sensor signals indicative of a vehicle travel state;

calculating an approximated velocity using said sensor signals;

determining a noise covariance associated with said sensor signals and said approximated velocity;

estimating a velocity of the vehicle with a Kalman filter framework, said Kalman filter framework using said noise covariance, said approximated velocity, and said sensor signals.

17. The method of claim 16 wherein said sensor signals include a wheel speed sensor signal, a lateral acceleration signal and a longitudinal acceleration signal.

18. A method of estimating a velocity of a vehicle comprising:

receiving sensor signals indicative of a vehicle travel state, including a wheel speed sensor signal, a lateral acceleration signal and a longitudinal acceleration signal;

calculating an approximated lateral velocity and an approximated longitudinal velocity using said sensor signals;

determining a noise covariance associated with said sensor signals, said longitudinal acceleration signal, said lateral acceleration signal said lateral approximated velocity and said longitudinal approximated velocity; and estimating a velocity of the vehicle with a Kalman filter framework, said Kalman filter framework using said noise covariance, said approximated velocity, and said sensor signals.

19. The method of claim 18 wherein said approximated lateral velocity, said approximated longitudinal velocity, said lateral acceleration signal and said longitudinal acceleration signal each have an associated reliability, said associated reliability being inversely related to said noise covariance.

20. A system for estimating a velocity of a vehicle, said vehicle having a driven wheel, a throttle, a brake pedal, and a steering wheel, wherein each of said throttle, said brake pedal, and said steering wheel have a rest position, said system comprising:

an accelerometer producing an acceleration signal;

a wheel speed sensor producing a wheel speed signal;

a yaw rate sensor producing a yaw rate signal;

a steering wheel angle sensor producing a steering wheel angle signal;

a brake position sensor producing a brake pedal position signal;

a throttle position sensor producing a throttle position signal;

a processor communicating with said sensors and configured to receive said signals;

a velocity calculation module receiving said wheel speed sensor signal and calculating an approximated velocity of the vehicle;

a noise covariance module receiving said acceleration signal and at least one other of said signals, said noise covariance module calculating a noise covariance associated with said approximated velocity and said acceleration signal, said acceleration signal and said approximated velocity each having an associated reliability, wherein said noise covariance is inversely related to said reliability; and a Kalman filter module estimating a velocity of the vehicle, said Kalman filter module including a Kalman filter framework configured to receive said noise covariance, said approximated velocity and said acceleration signal.

* * * * *

UNITED STATES PATENT AND TRADEMARK OFFICE
CERTIFICATE OF CORRECTION

PATENT NO.    : 6,816,804 B1
DATED         : November 9, 2004
INVENTOR(S)   : Hyeongcheol Lee It is certified that error appears in the above-identified patent and that said Letters Patent is hereby corrected as shown below:

<u>Title page,</u>
Item [56], References Cited, OTHER PUBLICATIONS, "Hac, A. et al., "Estimation Of Vehicle Side Slip Angle And Yaw Rate," Society Of Automotive Engineers, Inc. 2000-01-0606, pages 1-7 (2000)" should be -- Hac, A. et al., "Estimation Of Vehicle Side Slip Angle And Yaw Rate," Society Of Automotive Engineers, Inc. 2000-01-0696, pages 1-7 (2000) --.

<u>Column 1,</u>
Line 36, "arc" should be -- are --.

<u>Column 5,</u>
Line 56, "modem" should be -- modern --.

<u>Column 7,</u>
Line 51, "(he" should be -- the --.

<u>Column 8,</u>
Line 38, "|$_f$" should be -- |$_f$ --.

<u>Column 12,</u>
Line 24, "C$_{qxi}$" should be -- c$_{qxi}$ --.
Line 24, "C$_{rxi}$" should be -- c$_{rxi}$ --.
Line 24, "c$_{gyi}$" should be -- c$_{qyi}$ --.

<u>Column 13,</u>

Line 10, "$\hat{x}_{k|k-1} = \begin{Bmatrix} \hat{v}_{rxk|k-1} \\ \hat{v}_{ryk|k-1} \end{Bmatrix}$" should be -- $\hat{x}_{k|k-1} = \begin{Bmatrix} \hat{v}_{\alpha k|k-1} \\ \hat{v}_{\beta k|k-1} \end{Bmatrix}$ --.

<u>Column 14,</u>
Beginning before line 30, "$\hat{x}_{k+1|} = (A_k - K_k)\hat{x}_{k|k-1} + K_k Y_k + Tu_k$" should be -- $\hat{x}_{k+1|k} = (A_k - K_k)\hat{x}_{k|k-1} + K_k y_k + Tu_k$ --.

Beginning before line 35, "$\bar{a}_k = A_k - K_k$" should be -- $\bar{A}_k = A_k - K_k$ --

UNITED STATES PATENT AND TRADEMARK OFFICE
CERTIFICATE OF CORRECTION

PATENT NO. : 6,816,804 B1
DATED : November 9, 2004
INVENTOR(S) : Hyeongcheol Lee It is certified that error appears in the above-identified patent and that said Letters Patent is hereby corrected as shown below:

Column 14 (cont'd),

Beginning before line 40, "$\hat{x}_{k|k-1} = \begin{Bmatrix} \hat{v}_{rxk|k-1} \\ \hat{v}_{ryk|k-1} \end{Bmatrix}$" should be -- $\hat{x}_{k|k-1} = \begin{Bmatrix} \hat{v}_{exk|k-1} \\ \hat{v}_{eyk|k-1} \end{Bmatrix}$ --.

Column 15,

Line 55, "$Q_y = c_{qy1} \exp(-c_{qy2} \cdot |a_y|) + c_{qy3} \exp(-c_{qy4} \cdot |\delta| - c_{qy5} \cdot |\dot{\psi}|)$" should be -- $Q_y = c_{qy1} \exp(-c_{qy2} \cdot |a_y|) + c_{qy3} \exp(-c_{qy4} \cdot |\delta| - c_{qy5} \cdot |\dot{\psi}|)$ --.

Signed and Sealed this

Fourth Day of October, 2005

JON W. DUDAS
*Director of the United States Patent and Trademark Office*

UNITED STATES PATENT AND TRADEMARK OFFICE
CERTIFICATE OF CORRECTION

PATENT NO. : 6,816,804 B1
DATED : November 9, 2004
INVENTOR(S) : Hyeongcheol Lee It is certified that error appears in the above-identified patent and that said Letters Patent is hereby corrected as shown below:

Title page,
Item [56], References Cited, OTHER PUBLICATIONS, "Hac, A. et al., "Estimation Of Vehicle Side Slip Angle And Yaw Rate," Society Of Automotive Engineers, Inc. 2000-01-0606, pages 1-7 (2000)" should be -- Hac, A. et al., "Estimation Of Vehicle Side Slip Angle And Yaw Rate," Society Of Automotive Engineers, Inc. 2000-01-0696, pages 1-7 (2000) --.

Column 1,
Line 36, "arc" should be -- are --.

Column 5,
Line 56, "modem" should be -- modern --.

Column 7,
Line 51, "(he" should be -- the --.

Column 8,
Line 38, "1$^f$"" should be -- l$_f$ --.

Column 12,
Line 24, "C$_{qxi}$" should be -- c$_{qxi}$ --.
Line 24, "C$_{rxi}$" should be -- c$_{rxi}$ --.
Line 24, "c$_{gyi}$" should be -- c$_{qyi}$ --.

Column 13,

Line 10, "$\hat{x}_{k|k-1} = \begin{Bmatrix} \hat{v}_{rxk|k-1} \\ \hat{v}_{ryk|k-1} \end{Bmatrix}$" should be -- $\hat{x}_{k|k-1} = \begin{Bmatrix} \hat{v}_{\alpha xk|k-1} \\ \hat{v}_{\alpha yk|k-1} \end{Bmatrix}$ --.

Column 14,
Beginning before line 30, "$\hat{x}_{k+1|} = (A_k - K_k)\hat{x}_{k|k-1} + K_k Y_k + T u_k$" should be -- $\hat{x}_{k+1|k} = (A_k - K_k)\hat{x}_{k|k-1} + K_k y_k + T u_k$ --.

Beginning before line 35, "$\bar{a}_k = A_k - K_k$" should be -- $\bar{A}_k = A_k - K_k$ --

UNITED STATES PATENT AND TRADEMARK OFFICE
CERTIFICATE OF CORRECTION

PATENT NO. : 6,816,804 B1
DATED : November 9, 2004
INVENTOR(S) : Hyeongcheol Lee It is certified that error appears in the above-identified patent and that said Letters Patent is hereby corrected as shown below:

Column 14 (cont'd),

Beginning before line 40, "$\hat{x}_{k|k-1} = \left\{ \begin{array}{c} \hat{v}_{rxk|k-1} \\ \hat{v}_{ryk|k-1} \end{array} \right\}$" should be -- $\hat{x}_{k|k-1} = \left\{ \begin{array}{c} \hat{v}_{\alpha k|k-1} \\ \hat{v}_{\alpha k|k-1} \end{array} \right\}$ --.

Column 15,

Line 55, "$Q_y = c_{qy1} \exp(-c_{qy2} \cdot |a_y|) + c_{qy3} \exp(-c_{qy4} \cdot |\delta| - c_{qy5} \cdot |\dot{\psi}|)$" should be -- $Q_y = c_{qy1} \exp(-c_{qy2} \cdot |a_y|) + c_{qy3} \exp(-c_{qy4} \cdot |\delta| - c_{qy5} \cdot |\dot{\psi}|)$ --.

This certificate supersedes Certificate of Correction issued October 4, 2005.

Signed and Sealed this

Thirteenth Day of December, 2005

JON W. DUDAS
*Director of the United States Patent and Trademark Office*